Aug. 30, 1949.   I. A. MORBERG ET AL   2,480,499
BROACHING APPARATUS

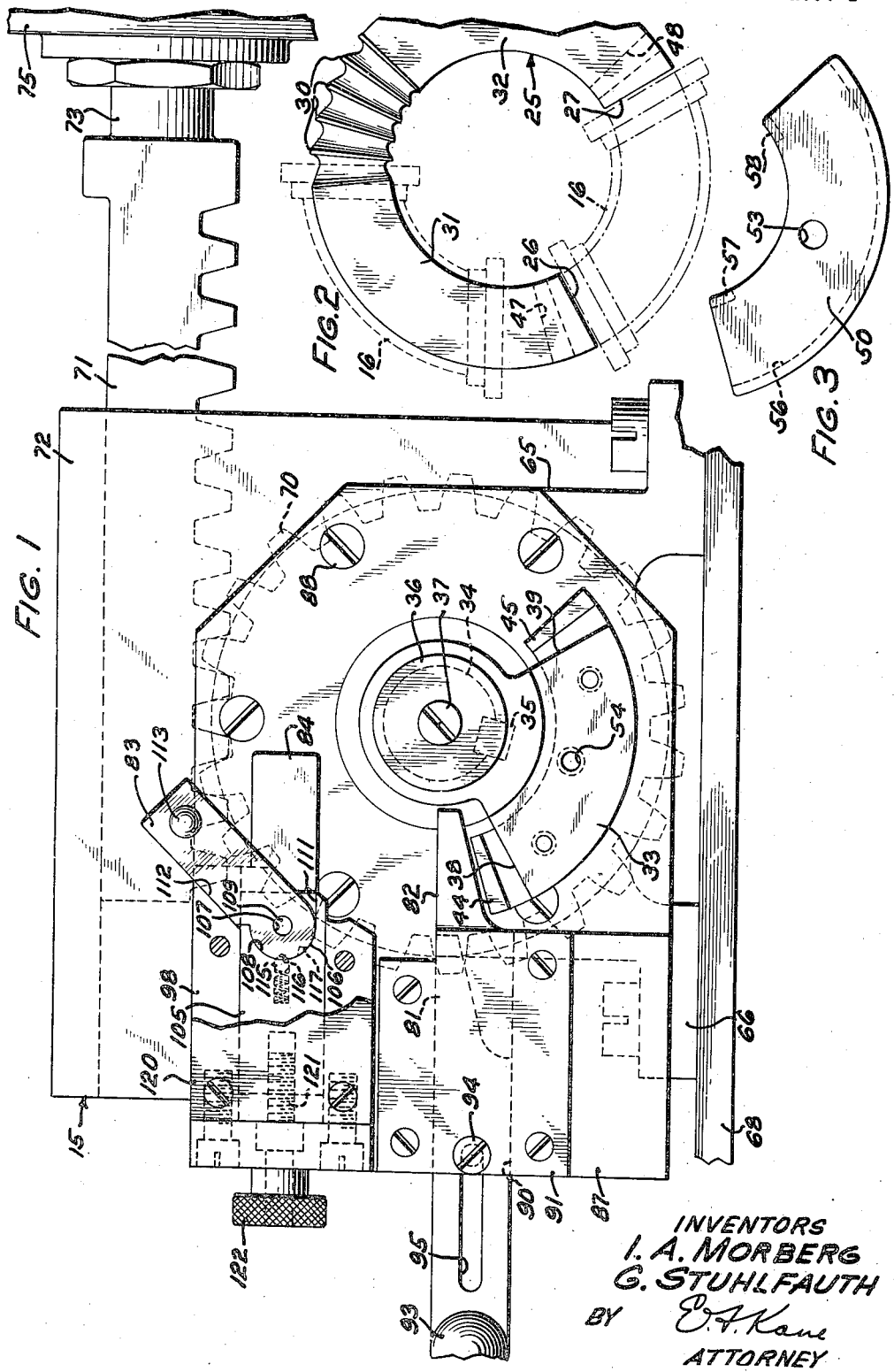

Filed Feb. 12, 1946   3 Sheets-Sheet 2

INVENTORS
I. A. MORBERG
G. STUHLFAUTH
BY E. F. Kane
ATTORNEY

Aug. 30, 1949.    I. A. MORBERG ET AL    2,480,499
BROACHING APPARATUS
Filed Feb. 12, 1946                    3 Sheets-Sheet 3
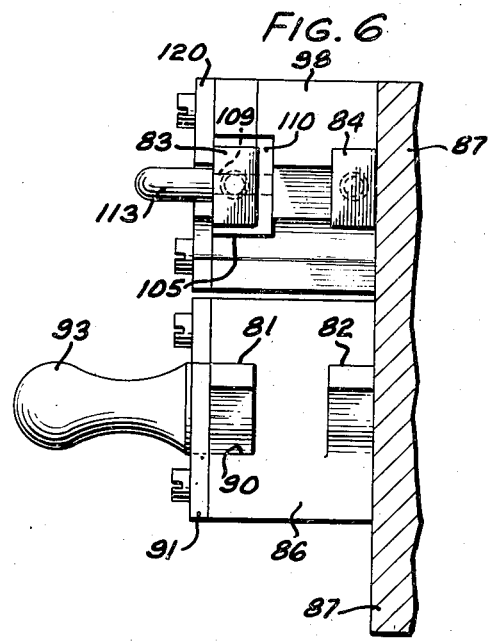
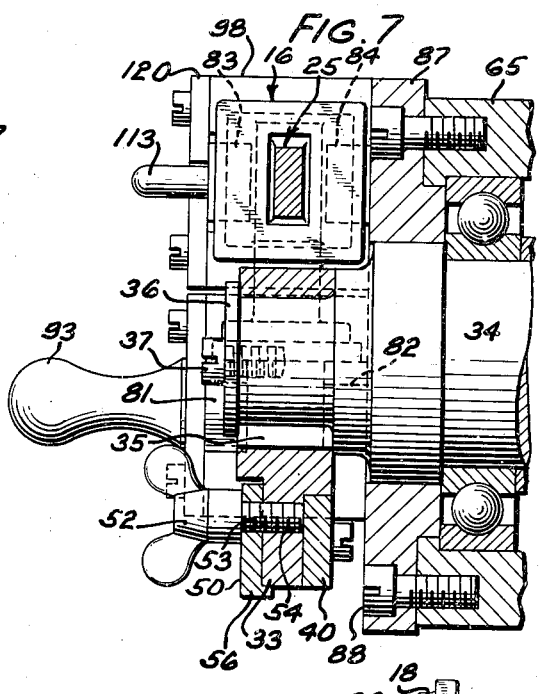
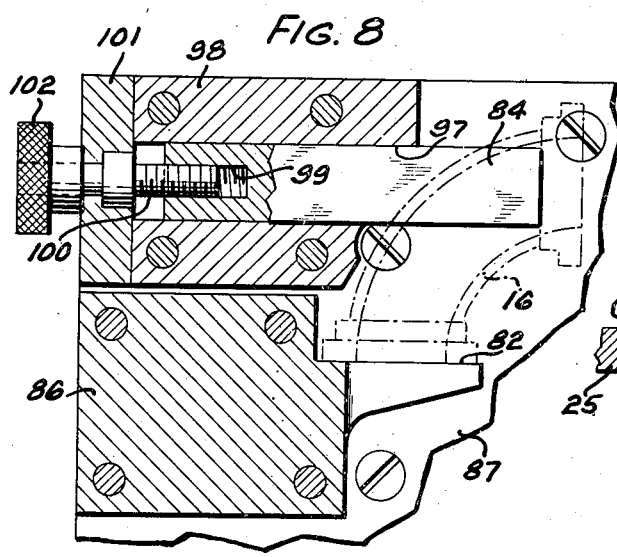
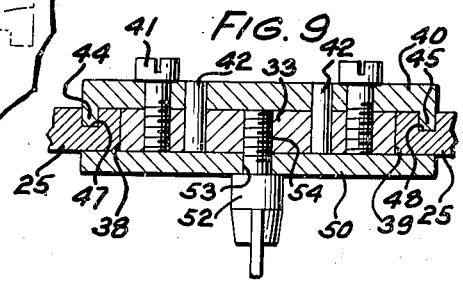
INVENTORS
I. A. MORBERG
G. STUHLFAUTH
BY  E. F. Kane
ATTORNEY Patented Aug. 30, 1949

2,480,499

UNITED STATES PATENT OFFICE 2,480,499

BROACHING APPARATUS

Ivar A. Morberg and George Stuhlfauth, Chicago, Ill., assignors to Western Electric Company, Incorporated, New York, N. Y., a corporation of New York Application February 12, 1946, Serial No. 647,146

11 Claims. (Cl. 90—33)

This invention relates to broaching apparatus and more particularly to broaching apparatus for broaching the interior surfaces of hollow arcuately shaped articles.

It is an object of the present invention to provide an efficient and effective apparatus for broaching the curved internal surfaces of articles.

In one embodiment of the invention, the apparatus is provided with a circular broaching tool formed as a major arc of a circle having cutting teeth spaced from its ends and having its ends spaced apart to receive a hollow circular article therebetween to permit the article to be assembled onto a portion of the tool, after which the ends of the tool are clamped to a rotatable driving member of the apparatus and the article is engaged by supporting members to hold it during the broaching operation.

The invention will be more fully understood from the following detailed description taken in connection with the accompanying drawings illustrating a preferred embodiment of the invention in which Fig. 1 is a front elevation of the apparatus with parts broken away and showing the apparatus with the broaching tool removed;

Fig. 2 is a fragmentary elevational view of the broaching tool and showing an article in dot and dash lines between the ends thereof in position to be assembled thereon and showing, in dotted lines, the article assembled thereon;

Fig. 3 is an elevational view of a clamping plate for clamping the broaching tool on the apparatus;

Fig. 6 is a fragmentary vertical section taken on the line 6—6 of Fig. 4 in the direction of the arrows showing the means for supporting the hollow article;

Fig. 7 is a fragmentary vertical sectional view of the device taken on the line 7—7 of Fig. 4 in the direction of the arrows and showing the article with the circular broaching tool therein;

Fig. 8 is a fragmentary vertical sectional view taken on the line 8—8 of Fig. 5 in the direction of the arrows showing the hollow article in dot and dash lines and some of the means for supporting the same;

Fig. 9 is an arcuate or developed section taken on the line 9—9 of Fig. 4 in the direction of the arrows showing the arm to which the broaching tool is attached and the means for attaching same; and Fig. 10 is an elevational view of the circular hollow part to be broached.

Figure 4:
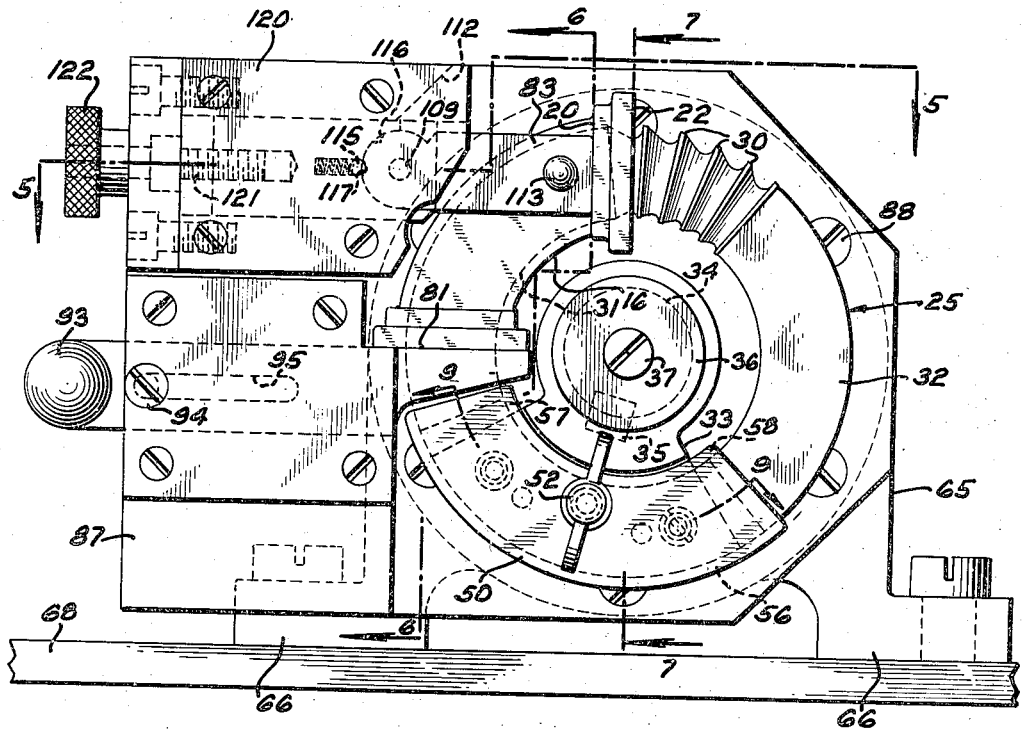
Fig. 4 is a front elevational view of the apparatus showing the broaching tool and the article in assembled relation thereon prior to the broaching operation.

In the embodiment of the invention illustrated herein, the apparatus is set up to broach the interior of an elbow member of a wave guide to a precise shape and size. The elbow member comprises a hollow arcuately shaped article 16 (Fig. 10) having thin walls and an arcuate aperture therethrough of rectangular shape in cross section and has formed thereon enlarged end flanges 18, 19 provided with shoulders 20—20 and 21—21 and finished end faces 22 and 23, respectively, the end faces being disposed at right angles to each other.

In order that the broaching operation may be performed thereon, the article 16 is adapted to be assembled or telescoped onto a removable arcuate broaching tool 25 (Figs. 2 and 4) of the broaching device. The broaching tool 25 is formed as a major arc of a circle and has flat radially disposed end portions 26 and 27 spaced apart a distance sufficient to receive the article 16 therebetween, as indicated in Fig. 2, to permit the assembling of a member 16 onto the broaching tool 25. In the central portion thereof, the broaching tool 25 is formed with a plurality of cutting edges or teeth 30, which are formed on all sides of the tool and increase progressively in size to conform to the size and shape of the aperture which is to be broached in the article. A guide portion 31 is formed on the broaching tool 25 between the end 26 and the teeth 30 of a reduced size to fit into the aperture of and receive the unbroached hollow article 16 thereon, as indicated in dotted lines in Fig. 2. A guide portion 32 is provided between the teeth 30 and the end portion 27 to receive the part 16 thereon after the cutting edges 30 have passed through the part on completion of the broaching operation. The guide portions 31 and 32 serve to position the hollow article radially relative to the cutting teeth during the broaching operation.

The broaching tool 25 (Figs. 1, 4 and 7) is adapted to be clamped to a rotatable drive member or tool holder comprising an arm 33 fixed to the end of a shaft 34 by a key 35, a retaining washer 36 and cap screw 37. The arm 33 has faces 38 and 39 angularly disposed with respect one to the other adapted to engage in abutting relation the ends 26 and 27 of the broaching tool 25. An arcuate plate 40, secured to the arm 33 by screws 41 and dowel pins 42, has radially disposed keys 44 and 45 formed thereon in spaced relation to the end surfaces 38 and 39 of the arm 33 (Figs. 1 and 9), which are adapted to fit into radial recesses or notches 47 and 48, respectively, formed in the end portions of the broaching tool 25. To clamp the broaching tool 25 in position on the arm 33, an arcuate clamping plate 50 is provided having end portions overlying and engaging the end portions of the tool 25 and secured to the arm 33 by a thumb screw 52 passing through an aperture 53 in the plate 50 and threadedly engaging an aperture 54 in the arm 33. An outer arcuate flange 56, formed on the plate 50, is adapted to engage portions of the periphery of the arm 33 and the ends of the broaching tool 25 and arcuate lugs 57 and 58 (Fig. 4) formed on the inner portion thereof are adapted to engage the inner periphery of the ends of the broaching tool 25 and the key members 44 and 45. The circular broaching tool 25, when secured to the drive member 33, is accurately positioned thereon with its axis concentric with the axis of rotation of the rotary tool holder 33 and the guide portions 31 and 32 thereof are of a length sufficient to receive an article 16 thereon between the teeth 30 and the tool holder 33 (Fig. 4).

The shaft 34, on which the arm 33 is secured, is mounted for rotation in suitable bearings in a housing 65 provided with feet 66 and secured to a base or supporting member 68. Also secured to the shaft 34 is a gear 70 (Fig. 1), the teeth of which mesh with the teeth on a rack bar 71 mounted for reciprocation in a guide member 72 of the broaching apparatus. The rack bar 71 may be secured to or formed integrally with a piston rod 73 cooperating with a fluid actuator 75 for receiving a limited reciprocatory movement therefrom to impart a predetermined rotary movement to the broaching tool 25.

Figure 5:
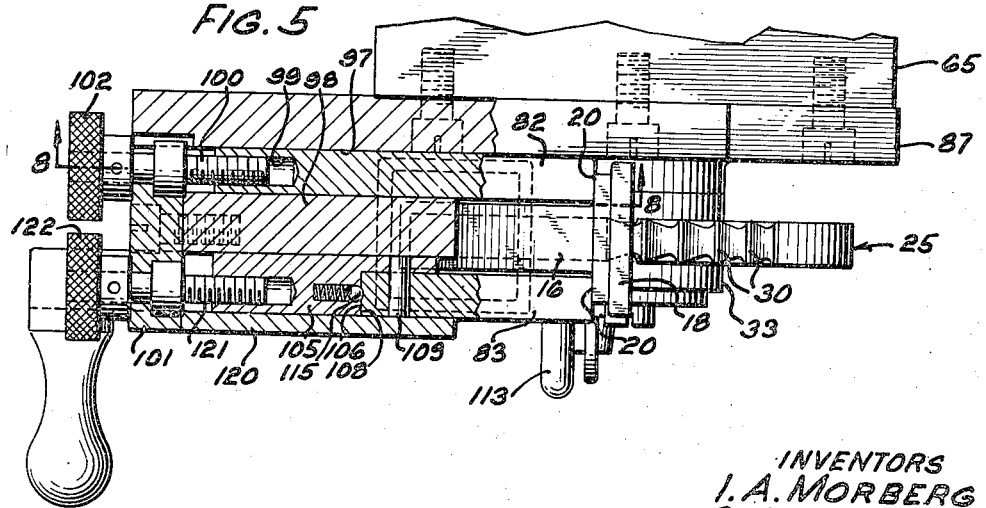
Fig. 5 is a fragmentary plan view of the apparatus showing parts in section taken along the line 5—5 of Fig. 4 in the direction of the arrows.

To support the arcuate article 16 in a stationary position during the broaching operation, the broaching apparatus is provided with a pair of supporting members 81 and 82 (Fig. 6) and an upper pair of supporting members 83 and 84 (Figs. 1, 5, 6 and 8). The supporting members 81 and 82 are spaced apart (Figs. 4 and 6) to straddle the broaching tool 25 and have horizontal flat surfaces to engage the end surface 23 of the circular article 16, and the supporting members 83 and 84 (Fig. 5) are likewise spaced apart to straddle the broaching tool 25 and the article 16 and have vertical end surfaces to engage the shoulders 20—20 of the article 16 (Figs. 4 and 5). To permit the broaching tool and the article 16 to be applied to and removed from the apparatus, the supporting members 81 and 83 are movable from the article supporting positions shown in Fig. 4 to the positions shown in Fig. 1.

The support 82, which is stationary, projects from and is formed integrally with a block 86 secured to a supporting plate 87, which is secured to the housing 65 by the cap screws 88. The movable support 81 comprises a rectangular elongated member slidably mounted in a recess 90 in the block 86 and retained therein by a plate 91. On the end opposite to that which supports the article 16, the supporting member 81 is provided with a handle 93, and a pin 94 in the plate 91 extends into a slot 95 in the member 81 to limit the movement thereof.

The member 84, which engages one of the shoulders 20 on the article 16, comprises a bar of rectangular cross section adjustably mounted in a recess 97 (Fig. 5) formed in a block 98 secured to the supporting plate 87 of the apparatus. A threaded aperture 99, formed in one end of the member 84, is engaged by a threaded adjusting member 100 rotatably mounted in a plate 101 secured to the block 98. The adjusting member 100 is provided with a knurled thumb nut 102 by means of which the adjusting member 100 may be turned to adjust the position of the supporting member 84 so that the end thereof engages one of the shoulders 20 and forms a rigid support therefor.

The member 83, which is movable to the position shown in Fig. 1 to facilitate the application and removal of a part 16 and the broaching tool 25, is pivotally mounted on an adjustable member 105. One end of the member 83 has a partially cylindrical surface 106, concentric with an aperture 107 formed therein and fits into a recess formed in the end of the member 105 and engages a cylindrical surface 108 thereof. The aperture 107 receives a pin 109 therein carried by the reduced wall portion 110 of the member 105. Arcuate movement of the member 83 is limited between a horizontal position, as shown in Fig. 4, where the underneath side thereof engages a horizontal supporting surface 111 (Fig. 1) of the member 105, and an inclined position, shown in Fig. 1, where the member 83 engages an inclined wall of the recess 112 formed in the supporting block 98. A handle 113 is provided on the end of a member 83 to facilitate moving it from one position to the other and the member 83 is retained in one or the other of its positions by the engagement therewith of a spring-pressed detent 115 engaging in recesses 116 and 117 formed in the cylindrical end of the member 83. The member 105 is slidably mounted in a rectangular aperture formed by a recess 119 in the supporting block 98 and a retaining plate 120 and is adjustable therein by means of a threaded member 121 rotatably mounted in the plate 101 and having a knurled handle 122, by which it may be rotated.

In the operation of the device, the circular broaching tool 25 is removed from the tool holder arm 33 and the article 16 to be broached is assembled thereon. The article 16 is placed between the ends of the broaching tool, as shown in Fig. 2, where it is in a position to be telescoped onto the portion 31 of the broaching tool. With the article 16 assembled on the guide portion 31 of the broaching tool 25, the tool 25 is brought into engagement with the tool holder arm 33 so that the key portions 44 and 45 thereof engage in the recesses 47 and 48, respectively, of the broaching tool 25. The retaining plate 50 is then applied to the arm 33 and secured thereto by the thumb nut 52 to clamp the end portions of the broaching tool tightly against the tool holder 33. The article 16, telescoped on the tool 25, is positioned as shown in Fig. 4 so that the end surface 23 thereof engages the upper horizontal surfaces of the supporting members 82 and 81, the member 81 having been advanced to the position indicated in Fig. 4, and the member 83 moved to horizontal position and the members 83 and 84 adjusted to firmly engage the shoulders 20—20 of the flange portion 18 of the article (Figs. 4 and 5). The member 16 is thus firmly supported at its two ends to withstand the rotary action of the broaching tool 25. The fluid actuator 75 may then be operated to advance the rack bar 71 a predetermined distance and impart a predetermined rotary movement to the broaching tool 25. During the broaching operation, the tool 25 is rotated through an angle sufficient to move the cutting teeth 30 through the article 16.

At the beginning of the broaching operation, the teeth of the broaching tool are positioned adjacent one end of the article, as shown in Fig. 4, with the arm 33 and the clamping plate 50 occupying the position shown therein, and, on completion of the broaching operation, after the cutting teeth 30 have passed through the article 16, the cutting teeth will be positioned adjacent the lower end thereof and the arm 33 and the clamping plate 50 will be positioned adjacent the face 22 of the article 16. The movable supporting members 81 and 83 may then be withdrawn from engagement with the article 16 to the positions shown in Fig. 1, and the broaching tool 25 and the article 16 thereon may be removed from the broaching apparatus by first removing the retaining plate 51. The broached article 16 may be removed from the tool 25 and the arm 33 returned to its normal starting position shown in Fig. 1, after which the tool and the apparatus are in condition to receive another article thereon for the performance of another broaching operation.

What is claimed is:

1. An elbow broaching apparatus comprising a rotatable shaft, a tool holder fixed to said shaft, a tool of partially annular configuration forming an incomplete annulus connectible to said holder and adapted to be received within the curved aperture of the elbow, said tool having broaching teeth formed on an arcuate area thereof, and means for attaching said tool to said holder to form, with the tool and holder, a rigid annular structure.

2. A broaching apparatus for broaching the interior of an elbow comprising a removable arcuate broaching tool formed as an incomplete annulus adapted to be received within the elbow to be broached and having end portions spaced apart to permit said elbow to be assembled thereon, means for rotating the tool, means for clamping said tool to said rotatable means, cutting edges on said tool intermediate the ends thereof, portions on said tool preceding and following the cutting edges for receiving an elbow thereon while the tool is clamped on said rotating means, and means for holding the elbow stationary during the broaching operation.

3. A broaching apparatus for broaching an arcuately shaped article comprising an arcuate broaching tool having ends spaced apart to permit an article to be telescoped thereon, a tool holder for clamping the tool in a predetermined relation thereto, cutting teeth on the tool in spaced relation to the ends thereof whereby a hollow article may be received on either end of the tool between the cutting teeth and the tool holder, means for holding the article in position relative to the cutting teeth of the tool, and means for causing relative movement between the tool and the article holding means to effect the broaching of said article.

4. A broaching apparatus for broaching the interior of an arcuately shaped hollow article comprising a removable arcuate broaching tool formed as a major arc of a circle and having end portions spaced apart to enable the article to be assembled onto the tool, cutting teeth on said circular broach intermediate its ends, guide portions between the cutting teeth and the ends of the circular broach to receive the hollow article thereon on opposite sides of the cutting teeth and for positioning the article relative to the cutting teeth, means for rotating said broaching tool, means for clamping said broaching tool to said rotatable means at points outside of the article to be broached, and means for holding the article stationary during the broaching operation.

5. In a broaching apparatus for broaching the internal surfaces of an arcuately shaped article, an arcuate broaching tool formed as a major arc of a circle and having ends spaced apart to enable an article to be assembled onto the tool, cutting teeth on said tool, a guide portion on said tool for receiving an unbroached article thereon between the cutting teeth and one end of the tool prior to the broaching operation, a guide portion on said tool for receiving a broached article thereon between the cutting edges and the other end of the tool following the broaching operation, a tool holder for supporting the tool and engageable with the ends thereof, means for clamping the tool to said tool holder, means for rotating the tool holder, and means for supporting the article during the broaching operation.

6. An arcuate broaching tool for broaching the internal surface of a hollow circular article comprising an arcuate tool having ends adapted to be clamped in a tool holder, cutting edges formed on the tool intermediate its ends, and guide portions on the tool preceding and following the cutting edges for receiving the article thereon between the cutting edges on the tool and the ends thereof when the tool is clamped in the tool holder and for guiding the article relative to the cutting edges during relative cutting movement between the article and the cutting edges, said ends being spaced apart a distance sufficient to enable the article to be assembled onto the tool.

7. An arcuate broach for broaching the interior of a hollow arcuately shaped article comprising an arcuate tool formed as a major arc of a circle and having end portions adapted to be engaged by a tool holder and spaced apart to enable the article to be broached to be assembled onto the tool, cutting teeth on the tool intermediate its ends, and guide portions between the cutting teeth and the end portions of the tool to receive the hollow article thereon on opposite sides of the teeth while the tool is held in the tool holder and to position the article relative to cutting teeth during relative movement therebetween.

8. A broaching apparatus for broaching the interior of an arcuately shaped hollow article comprising a removable arcuate broaching tool formed as a major arc of a circle and with the end portions spaced apart to enable the hollow article to be telescoped on said tool, a rotatable tool holder means for securing said tool in a predetermined position on said holder with the axis of the tool concentric with the axis of rotation of the tool holder, cutting edges on the tool intermediate the ends of said tool, means for holding the article during the broaching operation, and means for effecting relative movement between the tool holder and the article holding means to effect the broaching of said article.

9. A broaching apparatus for broaching the interior of a hollow arcuately shaped article comprising a removable arcuate broaching tool formed as a major arc of a circle, cutting teeth on said tool intermediate the ends thereof, a guide portion on said tool for receiving an unbroached article thereon between the cutting teeth and one end of the tool, a guide portion on said tool for receiving a broached article thereon between the cutting edges and the other end of the tool, said guide portions serving to position the article relative to the cutting edges during the broaching operation, a tool holder for supporting the arcuate broaching tool and engageable with the ends thereof, means for clamping the tool to said tool holder, means for supporting the article during the broaching operation, and means for effecting relative movement between the tool holder and the article supporting means to effect the broaching of said article.

10. A broaching apparatus for broaching the internal surface of a hollow arcuately shaped article comprising a rotatable shaft, means for supporting the shaft, a tool holder carried by the shaft, a removable arcuate broaching tool formed as an arc of a circle and having its ends receivable in a predetermined position in the tool holder with the axis of said tool concentric with the axis of rotation of the tool holder, means for clamping the tool in position on the tool holders, cutting teeth on the tool intermediate its ends, a guide portion on the tool in position to receive an unbroached article thereon between the cutting teeth and the tool holder, a second guide portion on the tool to receive the article thereon between the cutting teeth and the tool holder, said guide portions serving to position the article radially relative to the cutting teeth during a broaching operation, and means engaging the article to prevent the circumferential movement thereof during the broaching operation.

11. An elbow broaching apparatus comprising a rotatable shaft, a tool holder carried by the shaft, a removable arcuate broaching tool formed as a major arc of a circle and having its ends receivable in a predetermined position in the tool holder with the axis of said tool concentric with the axis of rotation of the tool holder, means for clamping the tool in position on the tool holder, cutting teeth on the tool intermediate its ends, a guide portion on the tool in position to receive an unbroached elbow thereon between the cutting teeth and the tool holder, a second guide portion on the tool to receive the elbow thereon between the cutting teeth and the tool holder, said guide portions serving to position the elbow radially relative to the cutting teeth during a broaching operation, stationary means engaging the elbow on one side of the tool, and means engaging the elbow on the other side of the tool and being movable to permit the application and removal of said elbow and said tool, said elbow engaging means serving to prevent circumferential movement of the elbow during the broaching operation.

IVAR A. MORBERG.
GEORGE STUHLFAUTH.

REFERENCES CITED

The following references are of record in the file of this patent:

UNITED STATES PATENTS

| Number | Name | Date |
| --- | --- | --- |
| 787,232 | Taylor | Apr. 11, 1905 |
| 2,113,554 | Johnson | Apr. 5, 1938 |
| 2,298,647 | Rossmann | Oct. 13, 1942 |

FOREIGN PATENTS

| Number | Country | Date |
| --- | --- | --- |
| 466,844 | Germany | May 14, 1930 |